United States Patent Office 3,002,927
Patented Oct. 3, 1961

---

3,002,927
STABILIZED ORGANIC SILICON FLUIDS
Richard W. Awe and Harry M. Schiefer, Midland, Mich., assignors to Dow Corning Corporation, Midland, Mich., a corporation of Michigan
No Drawing. Filed Jan. 2, 1959, Ser. No. 784,446
3 Claims. (Cl. 252—37.2)

This invention relates to novel organosilicon fluids which are capable of withstanding elevated temperatures.

It is known prior to this invention that iron salts would stabilize organopolysiloxanes against oxidation. This use is particularly shown in U.S. Patent 2,445,567. Iron salts have also been employed to stabilize organosilicon rubbers. In all cases, however, those salts have been added to the organosiloxane without any preconditioning of the mixture prior to use. Whereas this method does give improved oxidation stability over siloxane containing no iron, the resulting compositions are limited in oxidation stability. This is due in part at least to the fact that the iron precipitates from the organosilicon composition when the temperature exceeds 500° F. The formation of this precipitate not only shortens the life of the organosilicon composition, but also is disadvantageous in many uses since the precipitation tends to plug filters and small orifices in the mechanical systems in which organosilicon oils are commonly employed.

The applicants have discovered most unexpectedly that the oxidation stability of siloxane-iron compositions is vastly improved and the formation of undesirable precipitates is eliminated if the mixture of the siloxane and iron salt is pre-oxidized before use.

It is the object of this invention to provide a method of increasing the thermal life of organopolysiloxane fluids. Another object its to provide improved siloxane fluids for use as lubricants. Other objects and advantages will be apparent from the following description.

This invention relates to a method of preparing siloxane fluids which are stable to oxidation and which are free of precipitates which comprises heating a mixture of (1) an organopolysiloxane fluid in which the organic substituents are of the group methyl, phenyl, and halophenyl radicals, (2) an iron salt of a carboxylic acid having from 4 to 18 inclusive C atoms and (3) oxygen, at a temperature above 400° F. until the mixture will not form a precipitate when heated in the substantial absence of oxygen at a higher temperature.

In the process of this invention, it is essential that the mixture of siloxane, iron salt and oxygen be heated at a temperature above 400° F. and preferably from 450 to 600° F. This heating step is known as the "pre-oxygenation" process. If desired, higher temperatures may be employed. Obviously, the temperature should be below that at which decomposition of the siloxane will occur. The precise time of heating is not critical except that the heating time during the pre-oxygenation process should be sufficient so that the composition will not form a precipitate when subsequently heated in the substantial absence of oxygen at a temperature above that employed in the pre-oxygenation process.

In general the time of heating is sufficient when the color of the mixture changes to a deep reddish brown. When this point is reached, further heating does not substantially improve the stability of the fluid although it is often desirable to do so in order to insure the proper stability. In general it has been found that heating from 2 to 4 hours at 500° F. is sufficient in the pre-oxygenation step. It should be understood, of course, that for any fluid the lower the temperature the longer the time and the higher the temperature the shorter the time required for the pre-oxygenation process.

If the mixture of iron salt and siloxane is not heated in the presence of oxygen or if there is not sufficient heating the combination will form a precipitate when heated in the substantial absence of oxygen at temperatures of say 550 to 750° F. The term "substantial absence of oxygen" as employed herein means that the material is heated in an oxygen-free system or that it is heated under conditions where only the surface of the fluid is exposed to oxygen.

In carrying out the process of this invention the siloxane fluid and the iron salt may be mixed in any convenient manner. Ordinarily the iron salts are available in the form of solutions in hydrocarbon solvents. These solutions may be employed directly in the process of this invention. If desired, the solvent may be removed prior to the oxygenation step provided the iron salt per se is soluble in the siloxane.

The oxygen may be mixed with the siloxane-iron composition by any suitable means. This can be accomplished, for example, by bubbling oxygen through the siloxane fluid. Obviously it is preferable to have the gas as finely dispersed as possible. Alternatively a thin film of the mixture of siloxane and iron salt can be exposed to oxygen. For example, the siloxane can be caused to flow down a heated column packed with an inert material such as glass while oxygen passes in the opposite direction. Under these conditions, the thin film of siloxane flowing over the glass packing will be sufficiently well mixed with the oxygen to carry out the process of this invention. This method is suitable for continuous pre-oxygenation of the siloxane.

It should be understood that the term "oxygen" as employed herein includes pure oxygen together with air and other mixtures of oxygen with inert gases such as helium, argon, and the like.

The iron salts which are operable herein are those of carboxylic acids having from 4 to 18 C atoms inclusive. The iron can be added in either the ferrous or ferric state. Examples of such iron salts are iron hexoate, iron 2 ethyl hexoate, iron n-octoate, iron decoate, iron dodecoate, iron benzoate, iron phenylacetate, iron 3 methyl cyclopentylbutyrate, iron cyclohexylcaproate, iron stearate and iron t-butyl cyclohexyl acetate.

In the process of this invention the proportion of iron salt is not critical. That is, there is improvement in oxygen stability regardless of the amount of iron present. In general the more iron present the greater the oxygen stability of the fluid. The only limiting factor in the amount of iron which can be present in the product of this invention is the solubility of the iron salt in the siloxane fluid. In general satisfactory results are obtained when the amount of iron in the mixture is from .006 to .03% by weight based on the weight of the siloxane fluid.

The products of this invention are generally of a brown or reddish brown color and they remain clear solutions free of precipitate throughout their life. The chemical nature of these products is unknown. It is assumed from their properties that they are either reaction products of the iron salt and the siloxane in which iron atoms are attached to the siloxane molecules or they are solutions of iron (in some form) in the siloxane fluid.

The siloxanes which are suitable for use in this invention are methyl, phenyl, and halophenyl siloxanes. The siloxanes can contain any combination of the organic substituted siloxane units so long as the resulting material is a fluid. Thus the siloxane can be fluid combinations of $R_3SiO_{1/2}$, $R_2SiO$, $RSiO_{3/2}$, and $SiO_2$ units in which the R's are methyl, phenyl, or halophenyl radicals such as fluorophenyl, chlorophenyl, dichlorophenyl, tetrachlorophenyl, pentachlorophenyl, or bromophenyl. The preferred siloxanes are those which contain both methyl and phenyl radicals.

The compositions produced by the method of this invention are particularly adaptable for use as high temperature lubricants, greases, hydraulic fluids, heat transfer fluids and for use as heating baths for sterilizing surgical instruments.

The following examples are illustrative only and are not to be constituted as limiting the invention which is properly delineated in the appended claims. All percents are percent by weight.

*Example 1*

.25% of ferric octoate (containing 6% Fe) was added to 60 g. of a fluid polysiloxane composed of a trimethylsiloxy endblocked copolymer of dimethylsiloxane and phenylmethyl siloxane having a viscosity of 80 cs. at 25° C. The mixture was heated in a glass container for 2 hours at 500° F. while dry air was passed through the fluid at a rate of 50 ml. per minute. A glass dispersion stone was employed to disperse the air. The product was a clear, dark reddish brown fluid. It contained no precipitate.

This reaction product was put through the following tests.

(1) The 550° F. gel test was carried out by heating 40 g. of the composition in a 150 ml. beaker in an air circulating oven at the stated temperature.
(2) The 600° F. gel test was carried out by heating 1 g. of the composition in an aluminum dish on a hot plate which had a surface temperature of 600° F.
(3) The 700° F. gel test was run by placing 1 g. of the composition in an aluminum dish in an air circulating oven operating at 700° F. The results are shown in the table below.

| | Gel Time of Composition | Gel Time of Blank [1] |
|---|---|---|
| 550° F | 763 hours | 60 hours. |
| 600° F | over 500 hours | 1 hour. |
| 700° F | 18½ hours | ½ hour. |

[1] The blank contained no iron.

The residue after the 700° F. gel test for the composition was 21% while the blank gave a residue of 60%.

*Example 2*

.1% ferric octoate (containing 6% Fe) was mixed with the fluid of Example 1 and pre-oxygenated under the conditions of that example. The gel time in the 550° F. test was 496 hours. No precipitate formed during this test.

By contrast, .1% ferric octoate (containing 6% Fe) was mixed with the siloxane fluid of Example 1 and the mixture was immediately exposed to the 550° F. gel test without any pre-oxygenation. The gel time was 125 hours and a precipitate formed during the heating.

*Example 3*

80 g. of a fluid copolymer of trimethylsiloxane, dimethylsiloxane, phenylmethylsiloxane, and mono(dichlorophenyl) siloxane was mixed with .1% by weight ferric octoate and the mixture was heated 3 hours at 500° F. as air was passed through the mixture at the rate of 4 liters per hour.

The 550° F. gel time was 54 hours as compared with 37 hours for the blank. No precipitate formed during the heating of the composition containing the iron.

*Example 4*

60 g. of a 40 cs. fluid copolymer of diphenylmethyl siloxane and dimethylsiloxane was mixed with .25% of the ferric octoate of Example 1 and the mixture was then heated 2 hours at 500° F. as air was passed through the mixture at the rate of 50 ml. per minute. The resulting product had a 550° F. gel time of 236 hours and a 700° F. gel time of 2 hours. The blank had a 700° F. gel time of 15 minutes.

*Example 5*

Improved oxidation stability is obtained when a trimethylsiloxy endblocked dimethylsiloxane fluid is mixed with ferric octoate and treated in accordance with the procedure of Example 1.

*Example 6*

.06 g. of commercial iron naphthenate was added to 60 g. of the siloxane fluid of Example 1. The mixture was heated 1 hour at 500° F. as air was passed through at a rate of 50 ml. per minute.

The 550° F. gel time of the resulting fluid was in excess of 120 hours. The blank ran 60 hours in the same test.

*Example 7*

Equivalent results are obtained when the following salts are employed in the method of Example 6.

Ferric benzoate
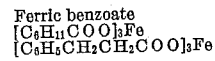
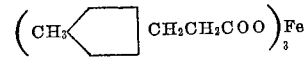

That which is claimed is:

1. A stable fluid which has been prepared by pre-oxygenating the fluid by heating a mixture of (1) a polysiloxane fluid in which the siloxane units are selected from the group consisting of units of the formula $R_3SiO_{.5}$, $R_2SiO$, $RSiO_{1.5}$ and $SiO_2$, in which each R is selected from the group consisting of methyl, phenyl, chlorophenyl, fluorophenyl and bromophenyl radicals, (2) a ferric salt of a carboxylic acid having from 4 to 18 inclusive carbon atoms, in amount such that there is from .006 to .03 percent by weight iron based on the weight of (1) and (3) oxygen mechanically dispersed in said fluid, at a temperature above 400° F. until the mixture changes to a reddish brown color and until the mixture will not form a precipitate when heated in the absence of oxygen at a temperature above that at which the pre-oxygenation step is carried out.

2. A fluid in accordance with claim 1, wherein some of the R groups are methyl radicals and the remaining R groups are phenyl radicals.

3. A fluid in accordance with claim 1, wherein each R is a methyl radical.

References Cited in the file of this patent

UNITED STATES PATENTS

| 2,209,646 | Egerton | July 30, 1940 |
| 2,395,307 | Weber et al. | Feb. 19, 1946 |
| 2,445,567 | Elliott | July 20, 1948 |